United States Patent Office.

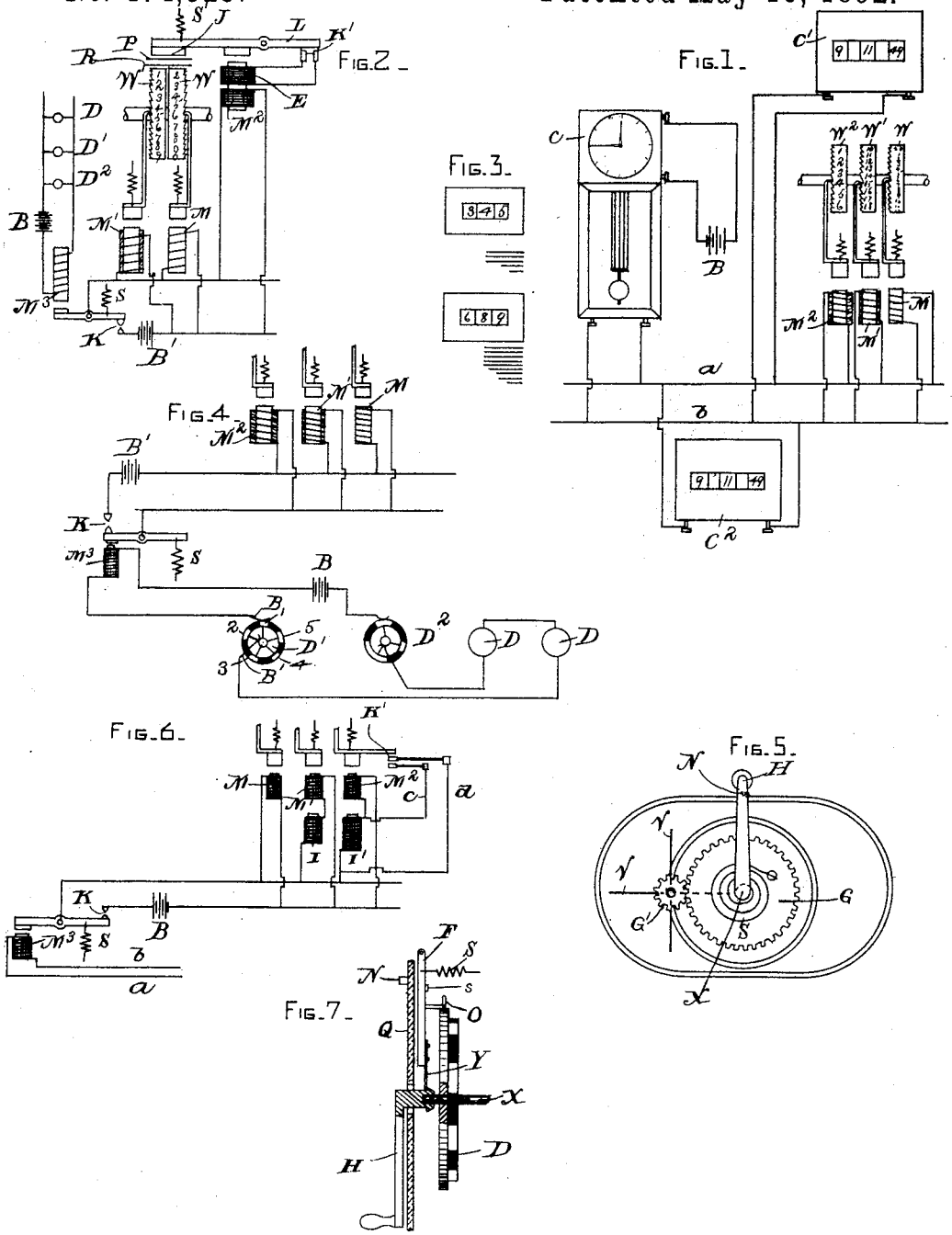

JOHN W. GIBBONEY, OF LYNN, MASSACHUSETTS.

ELECTRICAL INDICATOR.

SPECIFICATION forming part of Letters Patent No. 474,523, dated May 10, 1892.

Application filed December 10, 1891. Serial No. 414,546. (No model.)

*To all whom it may concern:*

Be it known that I, JOHN W. GIBBONEY, a citizen of the United States, and a resident of Lynn, in the county of Essex and Commonwealth of Massachusetts, have invented a new and useful Improvement in Electric Signaling and Recording Apparatuses, of which the following is a specification.

The object of my invention is to reduce the number of circuits or electric conductors usually employed in electric signaling, indicating, recording, and printing systems—such, for instance, as telegraph systems, annunciator systems, watchman's time-recorders, &c.—and also to secure the independent operation of electro-magnets connected to a single circuit, whereby they may be used to actuate different parts of a mechanism or perform different kinds of work in a mechanism, or whereby the lines may be duplexed in certain cases.

Another object of my invention is to obtain a magnet which is capable of moving its armature quickly, although such magnet is provided with a retarding arrangement, whereby it is made to respond to definite impulses of current or definite strength of current.

The improvements of my present invention are capable of a wide application in connection with a large number of existing types of electrical apparatus of the character I have above mentioned and others.

My invention consists in employing several magnets or a set of magnets for actuating the different parts of a mechanism, two or more of which are each provided with a retarding or counter-magnetizing circuit, and in so constructing these magnets that they will operate at different time intervals—that is, they will actuate their armatures in sequence when energized by current. I accomplish this result without employing any mechanical dash-pots or equivalent mechanical arrangements, which are liable to get out of order or out of adjustment, the control of the times of operation of the magnets being entirely electrical in its nature and absolutely unvarying, or nearly so, when once established.

In my invention the magnet which it is desired shall first operate may be an ordinary electro-magnet, such as is commonly employed. The magnet which is next to operate is delayed in action by causing it to lag magnetically behind the first magnet, and this is accomplished by placing upon its core a closed-circuited winding or band of conductor, or by influencing the circuit through its coils by an inductive device, which prevents its being magnetized as quickly as the first magnet.

In accordance with my invention a third magnet can likewise be provided with a short-circuited conductor upon its core or with an inductive device in its circuit greater in effect than that given to the second magnet, so that its working will be delayed, and it will act only after both the first and second magnets have operated. I can by this means, in fact, secure the progressive or successive working of a number of magnets, and can employ such magnets in various ways for securing results in such apparatus as I have mentioned which would ordinarily require a number of electric conductors or more complex mechanical arrangements, or for extending the application of apparatus already provided with arrangements for lessening the number of conductors needed to be employed.

Furthermore, my invention can be applied to nearly all of the existing electric systems and arrangements for the character of work I have mentioned, enhancing their usefulness or in other cases reducing their complexity.

My invention comprises, also, improvements in the operation of sluggished magnets or magnets whose action upon their armatures is electrically delayed, whereby their armature movements both toward and from such magnets are accomplished with rapidity.

My invention consists, likewise, in certain improvements in contact mechanism adapted to be used in connection with the above-mentioned magnets and other electrical mechanism operative by timed electric contacts, and these will be described in detail hereinafter.

I will describe my invention in connection with the drawings accompanying this specification, wherein I have shown it applied to a number of types of apparatus; but these drawings are not intended to show the extent of the application of the invention. It is by them merely desired to show some of the kinds of work to which my invention may be adapted.

Figure 1 shows my invention employed with an electric-clock system. Fig. 2 is an illustration showing its application to a station-indicating system, such as a watchman's-time system. Fig. 3 shows how it may be used with an annunciator system. Fig. 4 shows a modified way of operating my invention. Fig. 5 is a type of key or circuit-controlling device which may be used with my invention. It is, however, merely typical of any circuit-controlling arrangement which will do similar work.

In Fig. 1, C is a master-clock for electrically controlling the operation of a number of clocks connected to a common electric circuit. It is the common practice now in electric-clock systems to send an impulse of current over the circuit at regular intervals—say once a minute—and by a single magnet operate a pawl for rotating the hands of the clock over a dial. The arrangement I have here shown possesses no great merit over such a system of operation, and it is introduced chiefly to show how my invention might be employed in a clock system operated in a different manner. It does, however, reduce the number of parts required in the sub-station clocks, thereby reducing the cost of manufacture, and the time is also more easily read off than from a clock-dial. I employ or have shown hour, minute, and seconds wheels W W' W², though the seconds-wheel could be dispensed with, if desired. These wheels have the hour, minute, and seconds characters marked upon their peripheries and revolve in front of an opening in a casing under the influence of three magnets M, M', and M², the magnet M being, if desired, an ordinary magnet, the magnet M' having a short-circuited winding or closed copper band upon its core and the magnet M² having also a closed copper circuit upon its core greater in amount than that upon the core of the magnet M'. The master-clock C momentarily closes contact every second, so as to pass current from the battery B through the circuit $a\,b$. This impulse of current is of such duration that it will actuate the magnet M, but will fail to actuate the magnets M' M², because of the induced currents set up in the closed copper bands, which delays their magnetization. When the sixtieth second is reached, the contact at the master-clock is prolonged, so that the magnets M and M' operate, but not the magnet M² and the wheel W². When the sixtieth minute and sixtieth second are to be registered, the time of contact at the master-clock is still further prolonged, and all three magnets M M' M² operate and register an additional hour, the minute and seconds hands moving to "0."

I have not shown in Fig. 1 the arrangements upon the master-clock C for affecting the timed contacts required for the proper operation of the seconds, minute, and hour hands of the sub-station clocks. These timed contacts may be made by the clock mechanism in various ways. For instance, there may be placed upon the peripheries of wheels moving with the clock mechanism a number of contact-plates varying in length, such as are shown at D, Fig. 4, the sixtieth contact-plate of one wheel being longer than the others for the operation of the minute-hands of the sub-station clocks, and another wheel geared in the system revolving at a slower rate carrying contact-plates which made contact suitable for the operation of the hour-hands of the sub-station clocks. There are a number of different ways of making such contacts, some of which, like the above, are obvious and need not be described in detail. It will be seen that I require for this arrangement simply three magnets, three armatures, three retractile springs, and the three disks. A number of such clocks, as at C², may be run in multiple or series circuit upon the same system.

In Fig. 2 I have shown the application of my invention to a watchman's time-recording system or any electric system for recording upon paper or indicating at a station a number or character transmitted from a sub-station at which a key or circuit-controlling device has been operated. The sub-stations or points from which the signals are to be transmitted are indicated at D D' D². The circuit-controlling arrangements at these points may be similar to those shown in Fig. 4 at D D' D², to which I will refer in explaining the action.

In the operation of my invention it is best in most cases to employ a local battery, and in this figure the magnets M M' M² are all connected to a local circuit from the battery B', and this circuit is opened and closed by the action of the magnet M³, spring S, and the contact or switch points K. The magnet M may be an ordinary magnet, as before. The magnet M' is provided with a closed-circuit band of conducting metal about it, and the magnet M² is also provided with a closed-circuited band of conductor greater in amount than that of M', and is shown at E as consisting of a number of turns of conductor closed upon itself at the switch-points K'. The lever L carries the platen H, and upon being actuated by the magnet M² impresses the number or character at the top of the disks W W' upon the paper P, a suitable inked ribbon R being interposed between the disks and paper. The operation is as follows: Supposing the circuit-controlling arrangement D in the figure to be similar to D', Fig. 4, and that it is rotated at an approximately uniform speed, the contact 1 would first be reached, and then the contacts 2, 3, 4, and 5 in order. These contacts are made of such length that the armatures of the magnets M and M' are actuated, but the armature of the magnet M² fails to respond because of its being provided with a closed copper circuit having a greater retarding effect than that upon the magnet M'. The last contact 5, however, is made longer than any of the others, and then all three magnets respond, the magnets M and M' first, and then the magnet M². The magnet M' is first operated by suitable impulses to bring within one the character upon the disk W' which it is desired to print. Shorter impulses then rotate the wheel W, bringing the desired character within one of this disk which it is desired to print, and the longest impulse then brings the desired characters into position for printing, and likewise effects the printing. By suitably constructing the contact-plates it is manifest that any desired number can be brought to the printing-point and recorded upon the paper. The paper can be moved in the proper manner by clock-work, and the lever L can also operate a release device, so that the wheels W W' will return to their zero position; but I have not shown these parts of the apparatus, as they are found in existing constructions and form no part of my present invention. In this figure I have shown also the second improvement of my invention, which consists in so arranging the inductive circuit, by means of which the retarding action is effected, that the magnet to which it is applied will actuate its armature similarly to an ordinary magnet when once the armature begins to move—that is, it is capable of attracting and releasing its armature rapidly. Ordinarily a magnet to which an inductive circuit is applied, whereby its action is delayed, will move its armature rather slowly, because the inductive effect is constantly exerted; but in my improved arrangement, while the action of the magnet is delayed to a greater or less extent, its armature moves rapidly and positively after its incipient movement, because this movement is employed to control the inductive circuit by means of suitable switching appliances. Thus in the figure the coil E upon the magnet M² is closed by the contact K', and the magnet M² is thereby delayed in action; but as soon as its armature begins to move the contact at K' is opened and now the magnet M² is in the condition of an ordinary magnet and can attract or release its armature rapidly, which it must be able to do to properly effect the printing. This method of controlling the retarding effect upon the magnet is equally applicable if the magnets M M' M² are used on a local closed-circuit system. Thus in the case of a magnet provided with an inductive retarding-circuit always able to act, if the armature were held down and the printing operation accomplished by the release of the armature the printing would be accomplished rapidly, but the magnet would fail to attract its armature quickly and the speed of working would be reduced, as in the former case. Instead of effecting any printing the operation of the circuit-controller D' may simply energize magnets similar to M M' M², Fig. 1, and indicate the number of the sub-station upon the dial, as shown in Fig. 3. In this instance to show the number "345," for example, there would be required three long, one medium, and one short contact to be made at D', and to show the number "689," for example, there would be required six long, two medium, and one short contact to be made at D'. Any number may be brought to the reading position in the same way by suitably arranging the contact-plates of the circuit-controller D'. To indicate any number in which the unit value of the figures decreases toward the right requires a larger number of contacts to be made. Thus to indicate the number "543" at the station would require five long, nine medium, and nine short contacts at the contact-wheel D or D'; but numbers requiring so many contacts to be made need not be used, as aside from these there remains for use sufficient for as many stations as would be desired in practice.

In Fig. 4 it is merely shown that my invention can be employed on a closed-circuited system of wiring—that is, the circuit-controllers D D', &c., would be arranged in series and the contact broken during determined intervals by the operation of D', so that the magnet M³ would make or break circuit at the contact K and through the magnets M M' M², &c., and these magnets would acquire or lose magnetism in sequence in accordance with the local circuit being run on the open or closed circuit plan, thereby controlling the movement of the pawls, as in the previous figures. The contact-plates of various lengths are shown at D' in this figure and are numbered 1, 2, 3, 4, and 5.

In Fig. 5 I have shown one of the preferred forms of a circuit-controlling arrangement suitable for use in connection with the apparatus, Figs. 2, 4, and 6. The contact-disk D', Fig. 4, would be placed upon the shaft X and move with it. The brushes B and B' are in the circuit and may be arranged for either a series or multiple method of working, and to complete or interrupt the circuit, according as the system is operated in the closed or open circuit manner, the handle H, which, if desired, may be a movable key, would be given one revolution to the right until the stop N is again engaged thereby, a suitable ratchet (not shown) being provided, of course, to prevent the improper unwinding of the spring. If the handle H is made as a removable key, the act of taking it out of the key-hole may actuate any suitable release device for holding the wheel G, as shown in Fig. 7. The contact-plates and intervening insulating-spaces of the disk D' now rotate under the brushes B B', giving the requisite number of timed impulses or interruptions of current necessary to operate the apparatus at the central or receiving station properly. To obtain an approximately uniform rate of revolution of the wheel G, I provide air-vanes V V on the shaft of a smaller wheel G', geared to the wheel G, so as to have a relatively more rapid rate of movement. A magnetic retarding device such as I have described in another pending application would also be suitable for this purpose. This is only one of many forms of contact devices which may be used for securing these results, and of course any mechanism whatsoever which will give timed impulses of current or cause timed interruptions of current, as described, will suffice to actuate the devices of the invention properly.

Fig. 7 is a sectional side view of Fig. 5. Q is a part of the casing or box within which is contained the contact mechanism of Fig. 5. X is the shaft carrying the wheel G, alongside of which is the contact-disk D. F is an arm pivoted at one end and pulled toward the stop s by the spring S and having a projection, as shown, which engages with the pin O of the wheel G. The handle H, when it is placed in position upon the shaft X, engages with the spring Y, which is an extension of the arm F. The handle H may be given one revolution until it again reaches the stop N; but the wheel G is held from rotation by the pin O. Upon the removal of the key H, however, the projection of the arm F is withdrawn and the wheel G rotates. The key in its removal snaps past the spring Y and the projection of the arm F returns again to the position to catch the pin O when the revolution has been effected.

In Fig. 6 there is shown a modified way of securing the successive or progressive operation of the magnets M M' M², (three or more.) In this case, instead of a closed copper band or short-circuited winding being placed upon the magnet-core itself, I provide auxiliary cores I I', constructed to have different degrees of inductive effect and connected, respectively, to the circuits through M' and M², thereby delaying the action of these magnets in their order and securing the same result as before. The current from the local battery B is controlled by the contact K, operated by the magnet M³, as before. If it is desired that any one or all of the magnets M' M², Fig. 6, or additional magnets provided with inductive circuits greater in effect than those applied to M' M² shall operate quickly, as does the magnet M³, Fig. 2, then a branch circuit is led around the inductive device, as in the case of Fig. 2, and the incipient movement of the armature of such magnet will in this case close the branch, and it will therefore act thereafter as an ordinary magnet for that impulse of current.

What I claim as my invention is—

1. In combination with an electrically-actuated mechanism, two or more magnets for operating the same, each provided with an inductive retarding-circuit, but of different retarding capacity.

2. The combination, with an electro-magnet having a retarding-circuit and an armature, of a controller for the retarding-circuit operated by the initial movement of said armature.

3. The combination, in an electrical apparatus, of a set of magnets for controlling its movement, a counter-magnetizing or retarding circuit for delaying the action of one of said magnets, and switch-contacts in said circuit controlled by the armature of this magnet.

4. The combination, with three or more parts of a mechanism to be operated successively, of three or more magnets for operating the same, of which magnets two or more have retarding-circuits co-operating therewith and of different retarding capacity.

5. The combination, in an electrical apparatus, of a set of magnets controlling its movement, independent armatures for said magnets, a counter-magnetizing circuit or retarding-circuit for one of said magnets, and switch-contacts in said circuit controlled by the armature of this magnet.

6. In combination with an electrically-actuated mechanism, two or more electro-magnets for operating the same, independent armatures for said magnets, and independent inductive retarding-circuits for said magnets of different retarding capacity, substantially as described.

7. The combination, with an electro-magnet having a retarding-circuit and an armature, of a switch for opening and closing said retarding-circuit operated by the initial movement of said armature.

8. The combination, with a magnet having magnetizing and counter-magnetizing circuits and an armature, of a switch controlling the counter-magnetizing circuit operated by the incipient movement of said armature.

9. In combination with an electrically-actuated mechanism operated by a set of magnets adapted to move their armatures sequentially, a contact-brush, and a series of spaced contact-plates for controlling the circuit of said magnets, said brush and plates connected to opposite poles of the circuit, respectively, a spring for moving said contact brush and plates relatively, so as to cause the desired make and break of said circuit, a key for winding said spring, a detent for preventing motion of the brush and contact-plates while the spring is winding, and engaging connections between said detent and key, whereby during the removal of the key said detent is momentarily disengaged and the brush and contact-plates are free to move under the influence of the wound spring.

10. The combination, with an electrically-actuated mechanism operated by timed makes and breaks in an electric circuit leading to the same, of a contact device controlling said circuit, consisting of a series of spaced contact plates or terminals attached to one pole of the circuit, a contact plate or terminal attached to the opposite pole of the circuit, a spring for moving said plates relatively while in contact with each other, a key for putting said spring under tension, and a detent for preventing movement of said plates or terminals while the key is in position for actuating the spring, but adapted to be relieved so as to allow movement of said plates or terminals when the key is removed from position, substantially as described.

11. The combination, with an electro-magnet having a counter-magnetizing circuit and an armature, of a switch in the counter-magnetizing circuit operated by said armature.

JOHN W. GIBBONEY.

Witnesses:
BENJAMIN B. HULL,
DUGALD McKILLOP.